June 3, 1941.  W. W. DRUMMEY  2,243,945
TRACKLESS TROLLEY VEHICLE
Filed Dec. 13, 1939
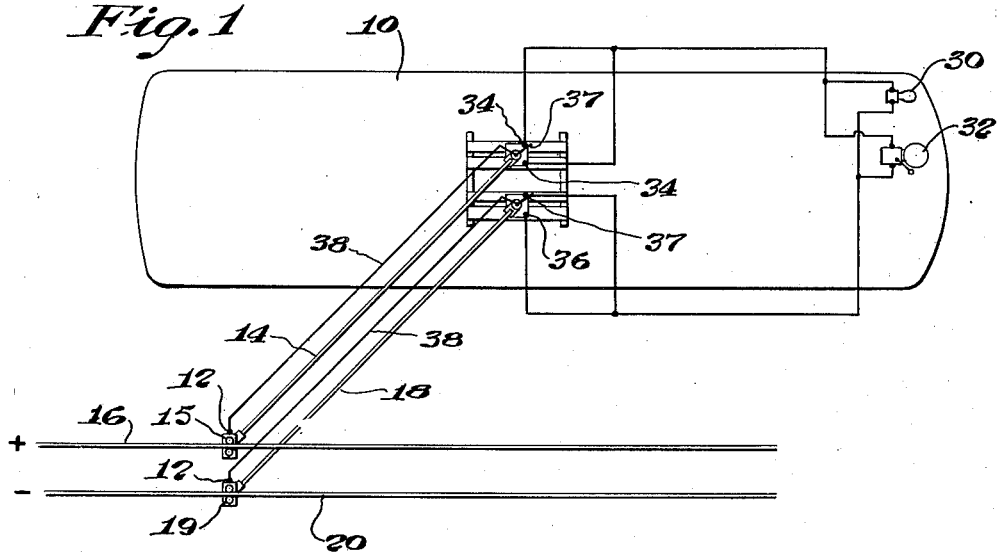
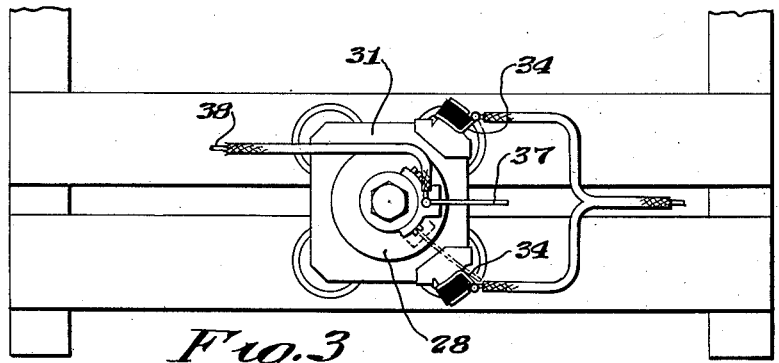
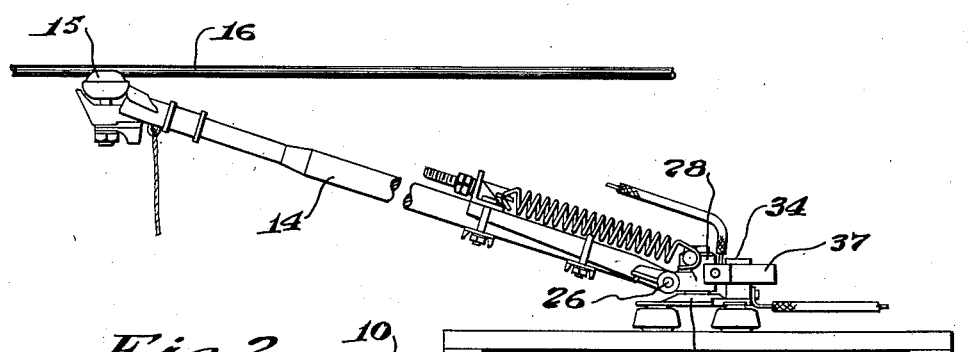
INVENTOR.
William W. Drummey
BY
J. Stanley Churchill
ATTORNEY.

Patented June 3, 1941

2,243,945

UNITED STATES PATENT OFFICE 2,243,945

TRACKLESS TROLLEY VEHICLE

William W. Drummey, Jamaica Plain, Mass.

Application December 13, 1939, Serial No. 308,907

1 Claim. (Cl. 191—1)

This invention relates to a trackless trolley vehicle.

The invention has for an object to provide a trackless trolley vehicle with novel mechanism for warning the operator of the vehicle when a safe limit has been reached in the lateral travel of the vehicle in either direction, thereby permitting the operator to correct the direction of travel of the vehicle before the trolley has been detached from the trolley wire and reducing to a minimum such occurrences.

With this general object in view and such others as may hereinafter appear, the invention consists in the trackless trolley provided with novel warning mechanism and also in the various structures, arrangements and combinations of parts hereinafter described and particularly defined in the claims at the end of this specification.

In the drawing illustrating the preferred embodiment of the invention, Fig. 1 is a diagrammatic plan view illustrative of a trackless trolley provided with the present warning mechanism and with the trolley vehicle in a position of maximum permissible lateral travel; Fig. 2 is a side elevation of a portion of the operating mechanism of the present warning mechanism, and Fig. 3 is a plan view illustrating the electrical contacts and associated parts forming part of the trolley mounting.

Prior to the present invention, considerable trouble, danger and expense have been experienced in the operation of trackless trolley vehicles in those instances where the vehicle has been directed laterally from the trolley wire beyond a predetermined distance, thus causing detachment of the trolley from the trolley wire and leaving the vehicle stranded and without power. The present invention aims to reduce to a minimum such occurrences and accordingly, provision is made for issuing a warning to the operator when a safe limit has been reached in the lateral travel of the vehicle in either direction, thereby permitting the operator to correct the direction of the vehicle before the trolley has become detached from the trolley wire. In the preferred embodiment of the invention, the warning mechanism may include an electrical lamp to be illuminated, or a bell to sound an audible signal, and such warning device or devices are operated electrically through circuits controlled by the angular position of the trolley pole. The electrical energy for operating the signal may and preferably will be obtained from the trolley wire.

Referring now to the drawing, which as above stated, illustrates the preferred embodiment of the invention, 10 diagrammatically represents a trackless trolley vehicle which may be of any usual or preferred structure adapted to travel without tracks and whose direction of travel is controlled by the operator in a manner analogous to a motor vehicle. The trackless trolley vehicle 10 is electrically driven deriving power through continuous contact of a contact member 15 at the end of the trolley pole 14 with the usual power trolley wire 16. The circuit is completed through a duplicate trolley pole 18, contact 19 and return trolley wire 20.

Each trolley pole 14, 18 is mounted to pivot vertically upon the usual pivot 26 itself secured in the movable member 28 of the usual pivotal mounting 31 secured to and insulated from the top or roof of the vehicle 10, which is arranged to permit the trolley poles 14, 18 to pivot laterally in the manner illustrated in Fig. 1, as the vehicle diverges from a position beneath the trolley wires. The trolley vehicle thus far described is of known construction and the parts thereof of themselves constitute no part of the present invention.

In accordance with the present invention, the trolley vehicle 10 is provided with one or more signalling devices herein shown as comprising an electric lamp 30 and bell 32. The lamp 30 and bell 32 are included parallel circuits forming a part of branch circuits leading to two sets of contacts 34, 36, each set of contacts being mounted upon the stationary member of the mounting 31 in a position to be engaged by a movable contact member 37 carried by the movable member 28 of the mounting 31. Each contact member is connected through a conductor 38 to the contact member 12 of its respective trolley pole so that as illustrated in Fig. 1, when the vehicle in its lateral travel has caused the trolley poles to be swung into a position corresponding to the maximum permissible lateral travel of the vehicle or in other words, into a position where further lateral movement would cause or be apt to cause, detachment of the trolley contacts from their respective trolley wires, the signal devices 30, 32 are operated. As herein shown, a circuit is established from the power trolley wire through the contact 15, the conductor 38, through the movable contact 37, through either of the stationary contacts 34 with which the movable contact is engaged, and thence through the wiring leading to the signalling devices 30, 32, back to the corresponding contact 36 of the second trolley pole and thence through the corresponding movable contact 37 and conductor 38 back to the return trolley wire 26. In this manner, a warning signal is given the operator when the vehicle has reached its maximum safe lateral travel enabling him to again direct the vehicle toward the center of the road and reducing to a minimum liability of detachment of the trolley from the trolley wire.

A particularly important result flowing from the equipment of a trackless trolley with the signalling mechanism of the present invention comprises the elimination of the danger of collision and accident to both the trackless trolley and to other vehicles because of the inability of the driver to control the operation of the vehicle without power. This danger results from the sudden detachment of the trolley from the trolley wire and the operator finding himself in a position where power is needed to avoid an accident, either by reason of collision with another vehicle while the trackless trolley is moving under its own momentum or after it has come to rest.

While the preferred embodiment of the invention has been herein illustrated and described, it will be understood that the invention may be embodied in other forms within the scope of the following claim.

Having thus described the invention, what is claimed is:

In a trackless trolley vehicle, a unitary trolley pole stand secured to the roof of said vehicle and supported on the outer surface of said roof, said stand including a stationary base attached to said roof and a trolley pole supporting member pivotally secured to said base member, a trolley pole attached to said trolley pole supporting member and provided with a contact shoe for engaging a trolley wire, a contact finger secured to said supporting member and projecting horizontally therefrom, said contact finger being electrically connected to said contact shoe, a pair of angularly spaced contact members secured to said stationary base and positioned at predetermined points on opposite sides of said contact finger to be engaged thereby upon a predetermined angular movement of said trolley pole supporting member in either direction relative to said base, a signal means within said vehicle, and electrical connections including said contact finger said contact members and a second trolley pole carrying a contact shoe engaging another trolley wire for establishing a circuit between said trolley wires for operating said signalling means when said contact finger engages one of said contact members.

WILLIAM W. DRUMMEY.